Jan. 24, 1950 W. K. RIEBER 2,495,480

AUXILIARY TRAVELING TURNTABLE DRIVE

Filed July 9, 1945 4 Sheets-Sheet 1

INVENTOR.
WILLIAM K. RIEBER,
BY
Robert W. Fulwider
ATTORNEY.

Jan. 24, 1950 W. K. RIEBER 2,495,480

AUXILIARY TRAVELING TURNTABLE DRIVE

Filed July 9, 1945 4 Sheets-Sheet 2

INVENTOR.
WILLIAM K. RIEBER,
BY
[signature]
ATTORNEY.

INVENTOR.
WILLIAM K. RIEBER,
BY
Robert W. Fulwider
ATTORNEY.

Jan. 24, 1950 W. K. RIEBER 2,495,480

AUXILIARY TRAVELING TURNTABLE DRIVE

Filed July 9, 1945 4 Sheets-Sheet 4

INVENTOR.
WILLIAM K. RIEBER,
BY Robert W. Fulwider
ATTORNEY.

Patented Jan. 24, 1950 2,495,480

UNITED STATES PATENT OFFICE 2,495,480

AUXILIARY TRAVELING TURNTABLE DRIVE

William K. Rieber, Los Angeles, Calif.

Application July 9, 1945, Serial No. 603,961

6 Claims. (Cl. 274—12)

My invention relates generally to sound translating means and more particularly to apparatus adapted for the recording and/or reproduction of letters, memoranda, music, telephone conversations, lectures, and the like. The invention is characterized by certain novel features applicable particularly to so-called "dictation" use, in which it is of particular advantage to be able to play back a portion of the recorded material without damage to the recorded surface, and with added convenience to the user as compared with presently available forms of apparatus of the same general character.

One of the particular objects of the invention is to provide a sound recording and/or reproducing apparatus, hereinafter referred to by the generic term "sound translating" apparatus, having a relatively fixed sound translating head including stylus means which forms the sound record, and/or follows the record to reproduce the sound, together with a relatively movable record-supporting carriage adapted to carry a recording surface past said stylus means in a combined rotational and rectilinear movement.

It is also an object of my invention to provide a sound translating device in which the stylus can be positioned to any one of an infinite number of positions over the record and hence can always be lowered into the desired record groove.

A further object is to provide a device of the character described in which auxiliary means is provided for rapidly moving the record supporting means and the sound translating head with respect to each other to thereby facilitate ready and quick adjustment of their respective positions.

Additionally it is an object to provide lead means for effecting the relative rectilinear movement between the record and stylus which is always in engagement and therefore eliminates many of the difficulties heretofore experienced in equipment of this kind.

The preferred form of my invention illustrated herein comprises a frame carrying a rotatably mounted lead-screw which is continuously engaged by a lead nut adapted to be moved longitudinally with respect to said lead screw upon relative rotation thereof, a record-supporting member, hereinafter referred to broadly as a carriage which is constrained to rectilinear movement with said lead nut, said carriage including a record receiving spindle operatively associated with said lead nut adapted to effect rotation of said lead nut; means for rotating said record, a sound translating head which includes stylus means engageable with said record, and auxiliary means for selectively rotating said lead-screw to effect a controlled translation of said record with respect to said sound head.

The normal operation of my device in the production of a sound track on the record, or the reproduction of sound therefrom, involves the rotation of the disc-shaped record, which causes rotation of the record spindle which in turn effects a rotation of the lead nut upon the lead screws, thus producing combined rotational and rectilinear movement of the record past the sound head. When desired, the operator may rotate the lead screw to effect a controlled rectilinear movement of the record with respect to said sound head, whereby any desired portion of the record may be quickly brought into operative engagement with the stylus.

Other objects and advantages of the invention will become apparent from the following description of a preferred embodiment thereof, and from the accompanying drawings, in which.

Figure 1:
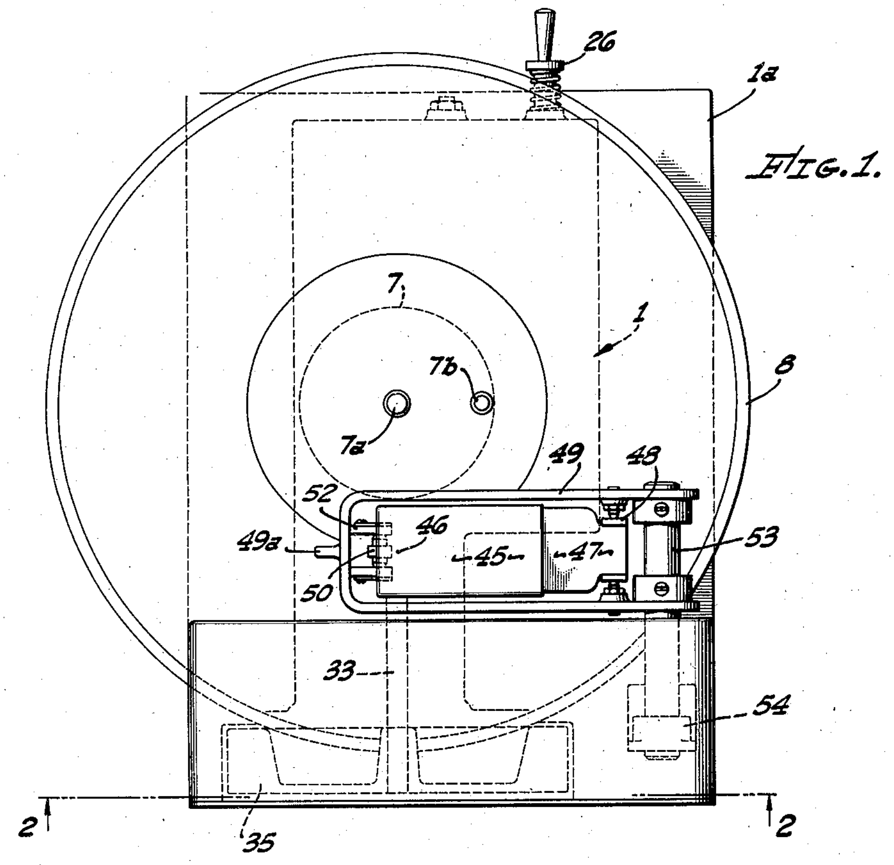
Figure 1 is a plan view of the device, showing a record in position to begin a recording.
Figure 2:
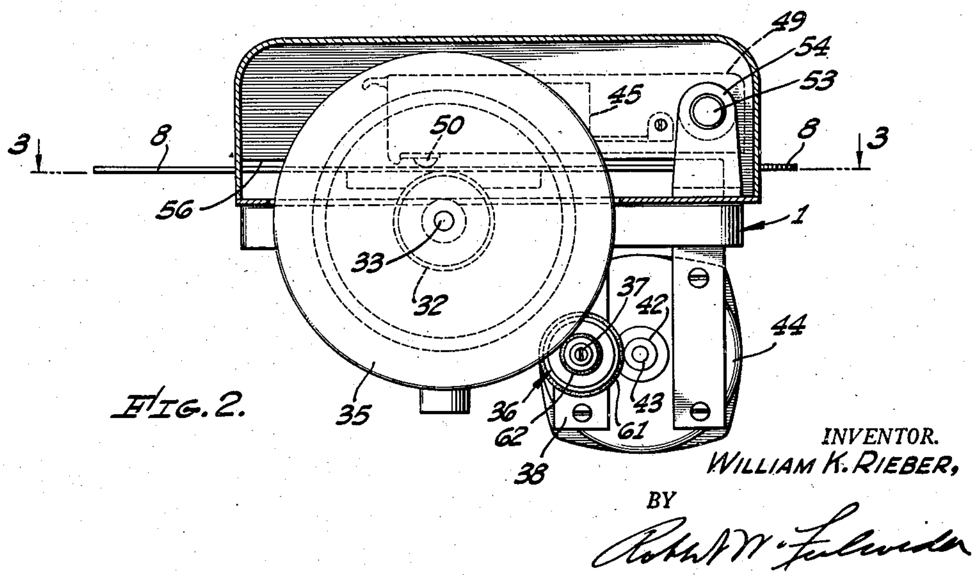
Figure 2 is a transverse sectional view thereof, taken on line 2—2 in Fig. 1.
Figure 3:
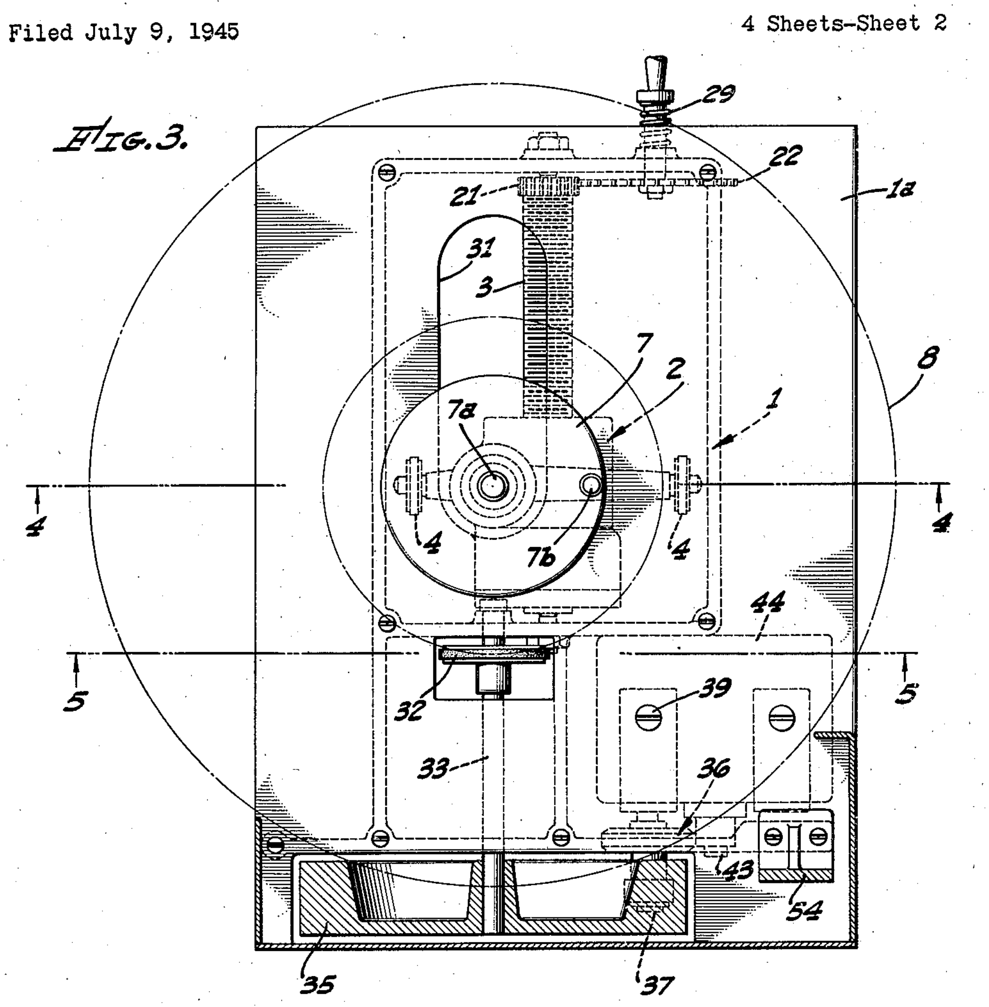
Figure 3 is a partly sectional plan view, taken on line 3—3 in Fig. 2 showing the record in broken lines.

Referring to the drawings, the numeral 1 indicates a frame having a table *1a* and a record supporting carriage 2 mounted on a horizontally disposed lead screw 3 and provided with guide rollers 4 adapted to engage the underside of the frame table *1a*. The lead screw 3 is pivotally mounted at its ends on the frame as at 5 for free rotational movement. The carriage 2 carries a vertical spindle 6 provided with a record supporting disc 7 adapted to receive a record 8. The disc 7 is preferably provided with a central guide pin *7a* adapted to pass through a centrally located opening in the record 8, and a radially spaced drive pin *7b* adapted to enter a co-actingly positioned drive opening in the record 8.

Figures 7, 9:
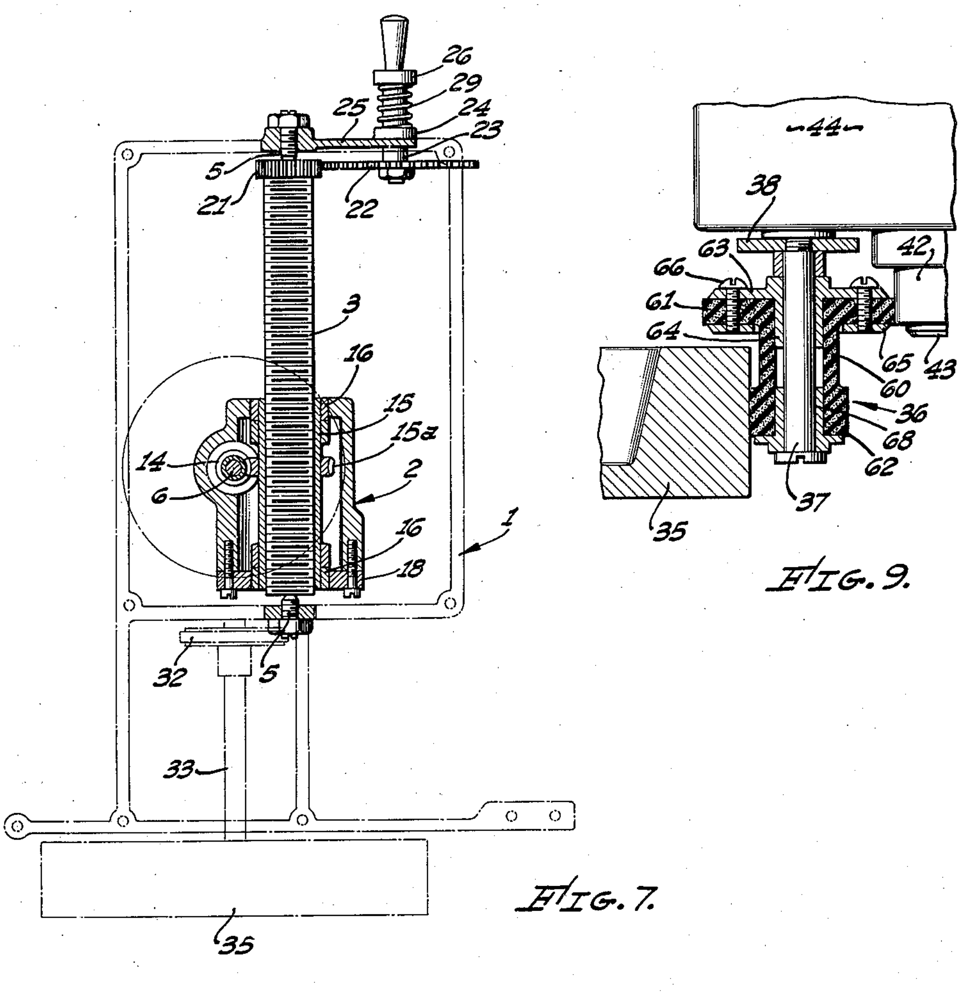
Figure 7 is a fragmentary plan section taken on line 7—7 in Fig. 6.
Figure 9 is a horizontal sectional detail taken on line 9—9 in Fig. 6.
Figure 8:
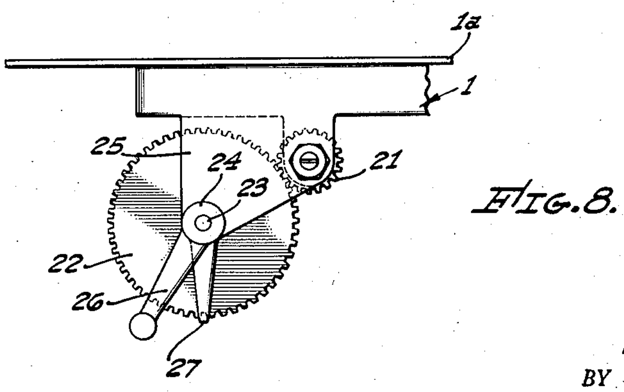
Figure 8 is a fragmentary elevation taken on line 8—8 in Fig. 6.

The spindle 6 is rotatably mounted in the carriage housing 9 by means of upper and lower bearings 10 and 11, the latter bearing including a bearing ball 12 and a retaining plug 13 adapted to position the spindle 6 vertically along its axis of rotation. A worm 14 is provided on the spindle 6, meshing with a worm gear 15*a* integral with a lead nut 15 threadedly mounted on the lead screw 3 for continuous engagement therewith. Suitable bearings 16 are provided at the respective ends of the lead nut whereby it is adequately positioned with respect to the carriage housing 9. A removable cover 18 may be provided as part of the housing 9, for the purpose of facilitating assembly, and one of the bearings 16 may be mounted in this cover, as shown more particularly in Fig. 7.

The lead screw 3 is provided adjacent one end with a pinion 21, engaged by a gear 22 mounted on a shaft 23 journaled in a bearing 24 provided in a bracket 25 which depends from the frame 1. A suitable crank handle 26 is provided on the shaft 23, whereby rotation of the lead screw 3 may be effected by rotation of the gear 22 through the handle 26, which will in turn move the carriage along the lead screw 3 in either direction, depending upon the direction of rotation of the handle 26. In order to fix the lead screw 3 against rotation under the influence of the rotation of the lead nut 15 as a result of rotation of the record spindle 6 as hereinafter described, I provide a detent 27 which may be formed as a projection of the frame bracket 25 and adapted to engage between two adjacent teeth on the gear 22. The shaft 23 is adapted for axial sliding movement whereby the gear 22 may be pushed axially out of engagement with the detent 27 in order to effect rotation of the gear 22 (the gear 21 on the lead screw 3 being of sufficient axial length to remain in mesh with the gear 22 at all times). A spring 29 is preferably provided to urge the gear 22 toward engagement with the detent 27 at all times.

It will be seen from the above description that rotation of the record spindle 6 through rotation of the record 8 will in turn cause rotation of the lead nut 15, and advance such lead nut and the associated carriage 2 along the length of the lead screw 3. This effects a translation of the record spindle in the direction of the axis of the lead screw, and a similar translatory movement of the driving carriage in either direction may be effected upon rotation of the lead screw 3 by rotation of the handle 26.

Figure 4:
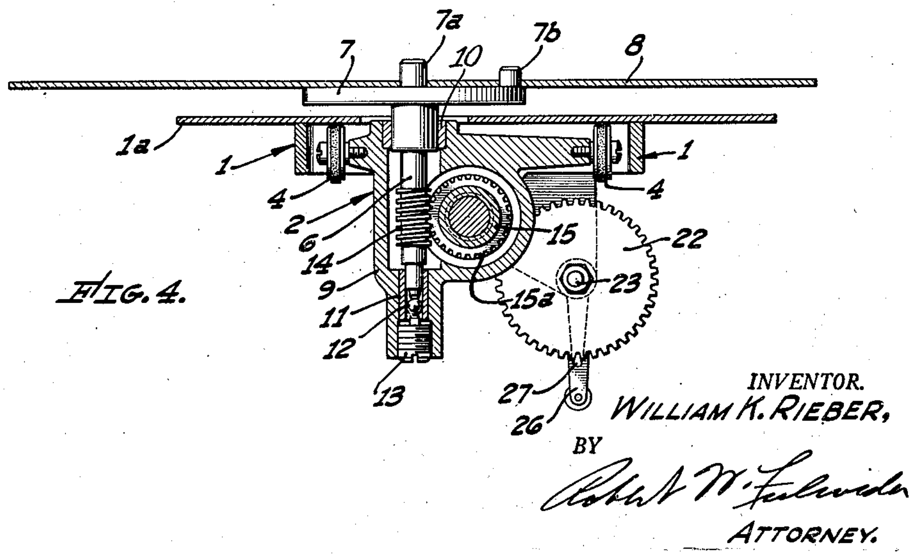
Figure 4 is a transverse sectional detail taken on line 4—4 in Fig. 3.
Figure 5:
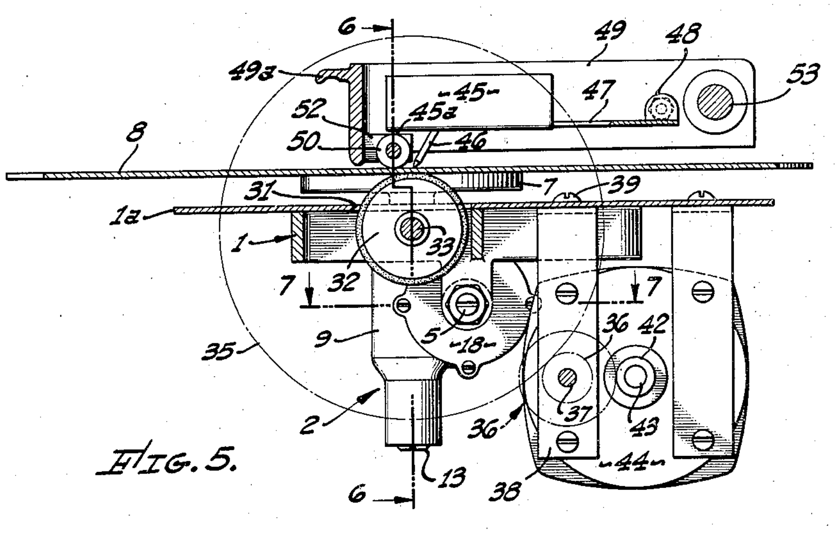
Figure 5 is a view corresponding to Fig. 4, taken on line 5—5 in Fig. 3.
Figure 6:
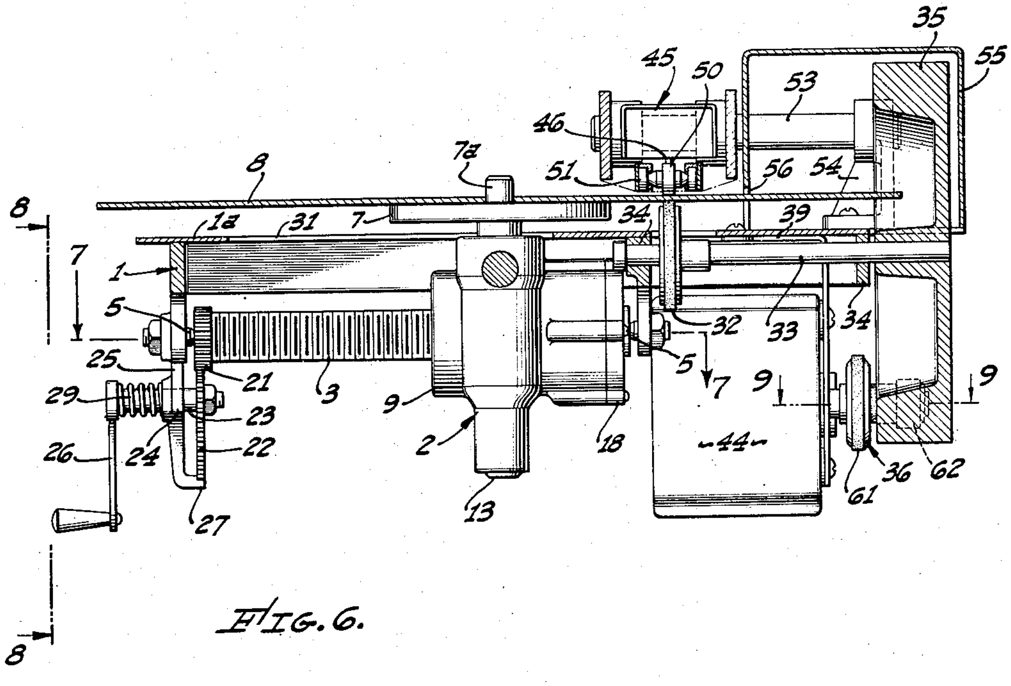
Figure 6 is a longitudinal sectional view taken on line 6—6 in Fig. 5.

The record spindle 6 extends through a slot 31 in the frame table 1*a*, and the record supporting disc 7 is located above such frame table, as shown more particularly in Figs. 4, 5, and 6. The record 8 carried by the disc 7 is adapted to be rotated through the agency of a drive wheel or puck 32 positioned to engage the lower surface of the record at the plane of the upper surface of the disc 7, said drive wheel 32 being mounted on a horizontal shaft 33 provided with bearings 34 and supported on the frame 1. At the outer end of the shaft 33 I provide a flywheel 35 adapted to be engaged by a friction drive coupling 36 mounted on a bearing shaft 37 which is carried by a support 38 mounted on the frame 1 at 39, and in engagement with the flywheel 35 and a driving drum 42. The driving drum 42 is secured to a drive shaft 43 of a drive motor 44 which is mounted on the frame 1 by suitable brackets.

The friction-coupling 36 may comprise a resilient torque sleeve 60 of rubber or comparable material formed with a relatively large flange 61 on one end and a smaller flange 62 on its other end. The flange 61 is preferably held between a washer 65 and the shoulder 63 of a shouldered bearing 64 by screws 66 as seen best in Fig. 9. A similar shouldered bearing 68 is secured in the other end of the torque sleeve 60, the bearings 64 and 68 rotatably supporting the friction-coupling on the shaft 37. The larger flange 61 frictionally engages the driving drum 42 and the smaller flange engages the flywheel 35 to thereby drive the latter at a speed less than that of the motor shaft 43.

The sound head indicated at 45 may carry a single stylus 46 as shown, for recording and/or reproducing, or separate styli as desired. In either case the operative stylus is positioned immediately above the record drive wheel 32 (the relationship being particularly shown in Figs. 5 and 6) in position to engage the record 8. The sound head 45 is pivotally mounted for free movement in a vertical plane, by a supporting arm 47 which is pivotally mounted at 48 upon a head support frame 49. The frame 49 also carries record hold-down means such for example as the roller 50 pivotally mounted at 51 upon a roller support bracket 52 extending inwardly from the forward end of frame 49, and is pivotally mounted for vertical movement upon a shaft 53 carried upon a support bracket 54 secured to the frame 1.

The pivotal mounting at 48 allows a floating action of the sound head to accommodate it to slight variations in different styli which may be employed at 46, and further permits the stylus to follow any irregularities in the record 8. The record hold-down roller 50 is positioned to engage the upper surface of the record 8 at a point as close as possible to the stylus 46 and consequently as near as possible to the vertical plane of the axis of the record drive wheel 32. When it is desired to disengage the stylus 46 from the record, the forward end of the sound head frame 49 is lifted by grasping handle 49*a* thus rotating the frame about the axis defined by the shaft 53 and raising the roller support bracket 52 to engage the forward edge 45*a* of the head 45 to disengage the stylus.

In the instant showing, it is intended that the recording head 45 be of the electrical type, but for clarity of illustration the electrical wiring conventional to such apparatus has been omitted.

The operation of the apparatus in the recording of dictation, for example, may be practiced by moving the carriage 2 to the extreme left (as viewed in Fig. 6), by rotation of the lead screw 3 through the agency of the handle 26, the handle being pushed in against the action of the spring 29 until the gear 22 is free of the detent 27. The carriage 2 being brought to this left-hand position, a suitable record 8, of cellulose acetate, cellulose nitrate, or the like, is placed upon the record supporting disc 7, the sound head being swung out of the way about pivot 53 for this purpose. The carriage 2 may then be moved to the right (as to the position of Fig. 6) by counter-rotation of the handle 26. Alternatively, the carriage 2 may be allowed to remain in the position of Fig. 6 and the record placed in its relative position, by sliding the right-hand edge of the record below the casing 55 which may be provided over the flywheel 35 and the support 54, a convenient slot 56 being provided for entry of the record.

The motor 44 is then started, which causes rotation of the flywheel 35, shaft 33, and the driving wheel 32. When it is desired that the recording be made, the recording head 45 is lowered, by lowering its frame 49, which allows the stylus 46 to engage the record, followed immediately by an engagement of the record by the roller 50. This latter engagement will cause the driving wheel 32 to compressively engage the lower surface of the record 8 (see Fig. 5), and rotate the same. Rotation of the record 8 will effect rotation of the spindle 6, which in turn will rotate the lead nut 15 on lead screw 3. Rotation of the lead nut 15 one revolution will advance the lead nut and its associated carriage 2 one thread on the lead screw 3.

According to a preferred embodiment of the invention, I provide an 18:1 ratio between the worm 14 and the worm gear 15*a*, and an eight-thread-to-the-inch pitch on the lead screw 3. This will cause the carriage 2 and the record 8 to be advanced at a rate such as to produce the sound grooves in the record at a spacing of 144 to the inch. Any other desired spacing, may, of course, be adopted for special applications, as will be apparent to those skilled in the art. I prefer to provide the lead screw 3 with a screw thread of such a hand as to effect rectilinear movement of the record spindle 6 away from the position of the stylus 46 as the record is rotated away from such stylus (as would be effected by a counterclockwise movement of the record drive wheel 32 in Fig. 5), whereby the recording is started adjacent the center of the record 8 and is formed outwardly as an expanding spiral. This relative arrangement may obviously be reversed, if desired.

During dictation, as well as during the subsequent transcription, it is frequently advantageous to cause the record to "play-back" a portion of the recording. This is accomplished by lifting the stylus away from the record by rotation of the sound frame 49 about the pivot 53, which disengages the roller 50 from the record. The rotation of the record 8 stops immediately, owing to the relatively small moment of inertia of the record spindle 6, disc 7 and record 8 as compared to the frictional losses in the worm-gear-lead-screw assembly. Rotation of the pinion 21 through the handle 26 will then cause a translation of the record in the direction of the axis of the lead screw 3; i. e., a translation of the record in its plane. Assuming a ratio of 18:1 between the worm 14 and worm gear 15*a*, the provision of 18 teeth on the pinion 21 will cause a translation of the record 8 just one record groove upon rotation of the gear 22 one tooth.

When the carriage 2 has been translated a sufficient amount to provide the desired length of "play-back," the sound head is lowered causing a reproducing stylus to engage the appropriate record-groove (before the roller 50 engages the record) and the subsequent engagement of the roller 50 with the record will reestablish the rotation of the record through the driving action of the wheel 32.

The use of a full lead nut in continuous engagement with the lead screw is a distinct advantage over the prior art devices using split nuts which must be disengaged from the lead screw when it is desired to move the record carriage. Disengageable split nuts accumulate dirt and are seldom in the proper position to drivingly engage the screw immediately. Quite often several revolutions of the record are necessary before the split nut seats itself in driving engagement with the lead screw and starts the translatory motion of the carriage which results in the loss of any material recorded during the first few rotations and in some cases the stylus cuts clear through the record before the nut takes hold. However, in my invention the nut is always in position to drive the lead screw immediately so that any rotation of the record causes instant and continuous relative rectilinear movement between the record and the sound head, thus eliminating any possibility of damaging the record or its contents.

While I have described a preferred form of my invention in which the frame and sound head are stationary and the record-supporting carriage moves relative thereto, it will be apparent that a relative reversal of the associated elements of the construction is within the spirit of this disclosure; i. e., the record-supporting carriage may be held stationary and the frame and sound head adapted for axial movement with respect thereto. Likewise while I have shown the lead nut as normally rotatable and the lead screw as normally held against rotation, it will be obvious that this relationship may also be reversed. Consequently the invention is claimed in certain of the appended claims in terms of the relative movements and relationships which must be established between the various elements of the assembly in order to attain the benefits of my construction.

While the particular apparatus herein shown and described in detail is fully capable of attaining the objects and providing the advantages hereinbefore stated, it is to be understood that it is merely illustrative of the presently preferred embodiment of my invention, and that I do not mean to limit myself to the details of construction or design herein shown, other than as defined in the appended claims.

I claim:

1. A sound translating device which includes: a frame; a carriage movably mounted with respect to said frame; a lead screw rotatably mounted on said frame; a lead nut mounted on said carriage and rotatably engaging said lead screw; a spindle rotatably mounted on said carriage and operatively connected with said lead nut whereby rotation of said spindle will cause rotation of said nut to thereby move said carriage rectilinearly with respect to said frame; means for supporting a record on said spindle for rotation therewith; a sound translating head mounted on said frame for engagement with a record supported on said spindle; means for rotating said spindle to thereby cause simultaneous relative rotational and rectilinear movement of said record with respect to said head; and means for selectively rotating said lead screw to effect rectilinear movement of said carriage with respect to said frame, said means comprising a pinion mounted on said lead screw for rotation therewith, a gear rotatably mounted on said frame in sliding engagement with said pinion, a handle for rotating said gear, a detent adapted to engage said gear to hold it against rotation, and a spring normally holding said gear against said detent but permitting it to be moved out of engagement therewith for rotation by said handle.

2. A sound translating device which includes: a frame; a carriage movably mounted with respect to said frame; a lead screw rotatably mounted on said frame; a lead nut mounted on said carriage and rotatably engaging said lead screw; a spindle rotatably mounted on said carriage, said spindle being provided with a worm and said lead nut being provided with a worm gear in constant engagement with said worm, whereby rotation of said spindle will cause rotation of said lead nut to thereby move said carriage rectilinearly with respect to said frame; means for supporting a record on said spindle for rotation therewith; a sound translating head mounted on said frame for engagement with a record supported on said spindle; means for rotating said spindle to thereby cause simultaneous relative rotational and rectilinear movement of said record with respect to said head; and means for selectively rotating said lead screw to effect rectilinear movement of said carriage with respect to said frame, said means comprising a pinion mounted on said lead screw for rotation therewith, a gear rotatably mounted on said frame in sliding engagement with said pinion, a handle for rotating said gear, a detent adapted to engage said gear to hold it against rotation, and a spring normally holding said gear against said detent but permitting it to be moved out of engagement therewith for rotation by said handle.

3. A sound translating device which includes: a frame; a carriage movably mounted with respect to said frame; a lead screw rotatably mounted on said frame and supporting said carriage; a lead nut mounted on said carriage and rotatably engaging said lead screw; a spindle rotatably mounted on said carriage, said spindle being provided with a worm and said lead nut being provided with a worm gear in constant engagement with said worm, whereby rotation of said spindle will cause rotation of said lead nut to thereby move said carriage rectilinearly with respect to said frame; means for supporting a record on said spindle for rotation therewith; a sound translating head mounted on said frame for engagement with a record supported on said spindle; means for rotating said spindle to thereby cause simultaneous relative rotational and rectilinear movement of said record with respect to said head, said means comprising a driving roller adapted to engage the under surface of said record, means for holding said record in engagement with said driving roller and power means for rotating said driving roller; and means for selectively rotating said lead screw to effect rectilinear movement of said carriage with respect to said frame, said means comprising a pinion mounted on said lead screw for rotation therewith, a gear rotatably mounted on said frame in sliding engagement with said pinion, a handle for rotating said gear, a detent adapted to engage said gear to hold it against rotation, and a spring normally holding said gear against said detent but permitting it to be moved out of engagement therewith for rotation by said handle.

4. In a sound translating device having a sound head engageable with a rotating record, means to effect relative linear motion of said record and sound head comprising: a rotatably mounted lead member driven by said rotating record; a complementary lead member rotatably mounted and engaged with said first lead member; and adjusting means including a gear train having a gear mounted on said complemental lead member, a detent engageable with said gear train to prevent rotation thereof, a spring connected to urge said gear train and detent into said engagement, and a handle connected to said gear train and adapted to move the same to disengage said detent and drive said gear train to rotate said complemental lead member.

5. In a sound translating device having a sound head engageable with a rotating record, means to effect relative linear motion of said record and sound head comprising: a rotatably mounted lead member driven by said rotating record; a complementary lead member rotatably mounted and engaged with said first lead member; and means to selectively hold said complemental lead member or rotate the same concurrently with said record rotation, said last-named means including a gear train having a first gear mounted on said complemental lead member for rotation therewith and a second gear mounted for rotation adjacent said first gear and meshed therewith, a detent adapted to engage said gear train to prevent rotation thereof, a spring positioned and adapted to hold said detent in said engagement, and manually operable means operatively connected to said spring to flex the same to disengage said gear train and detent, said manually operable means being operatively connected to said second gear to rotate the same and drive said complemental lead member.

6. In a sound translating device having a sound head engageable with a rotating record, means to effect relative linear motion of said record and sound head comprising: a rotatably mounted lead member driven by said rotating record; a complementary lead member rotatably mounted and engaged with said first lead member; and means to selectively hold said complemental lead member or rotate the same, said last means comprising a pinion mounted on said complemental lead member for rotation therewith, a gear rotatably mounted adjacent said pinion and in sliding engagement therewith, a handle for rotating said gear, a detent adapted to engage said gear to hold it against rotation, and a spring normally holding said gear against said detent but permitting it to be moved out of engagement therewith for rotation by said handle.

WILLIAM K. RIEBER.

REFERENCES CITED

The following references are of record in the file of this patent:

UNITED STATES PATENTS

| Number | Name | Date |
|---|---|---|
| 385,886 | Tainter | July 10, 1888 |
| 2,076,298 | Harris | Apr. 6, 1937 |
| 2,290,094 | Clausen | July 14, 1942 |
| 2,366,458 | Proctor | Jan. 2, 1945 |
| 2,391,784 | Johnston | Dec. 25, 1945 |